(12) United States Patent
Wagle et al.

(10) Patent No.: US 12,134,728 B2
(45) Date of Patent: Nov. 5, 2024

(54) ETHYLENE AMINE HYDROCHLORIDE BASED SHALE INHIBITOR FOR AQUEOUS DRILLING FLUIDS

(71) Applicant: SAUDI ARABIAN OIL COMPANY, Dhahran (SA)

(72) Inventors: Vikrant Wagle, Dhahran (SA); Abdullah Al-Yami, Dhahran (SA); Omprakash Pal, Dhahran (SA); Ali Al-Safran, Dhahran (SA); Mohammad Alharthi, Dammam (SA); Sara Alkhalaf, Alkhobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 92 days.

(21) Appl. No.: 17/716,353

(22) Filed: Apr. 8, 2022

(65) Prior Publication Data
US 2023/0323183 A1    Oct. 12, 2023

(51) Int. Cl.
C09K 8/04 (2006.01)
C09K 8/035 (2006.01)
C09K 8/528 (2006.01)

(52) U.S. Cl.
CPC ............... C09K 8/04 (2013.01); C09K 8/035 (2013.01); C09K 8/528 (2013.01); *C09K 2208/12* (2013.01)

(58) Field of Classification Search
CPC ....... C09K 8/04; C09K 8/035; C09K 2208/12
See application file for complete search history.

(56) References Cited

U.S. PATENT DOCUMENTS

| | | |
|---|---|---|
| 2,761,843 A | 9/1956 | Brown |
| 2,950,246 A | 8/1960 | Hughes et al. |
| 4,493,771 A | 1/1985 | Wilson et al. |
| 4,515,708 A | 5/1985 | Haslegrave et al. |
| 5,057,467 A | 10/1991 | Croft |
| 5,558,171 A | 9/1996 | McGlothlin et al. |
| 5,593,953 A | 1/1997 | Malchow, Jr. |
| 5,641,385 A | 6/1997 | Croft et al. |
| 5,861,537 A | 1/1999 | Shinohara et al. |
| 6,153,049 A | 11/2000 | Croft |
| 6,312,560 B1 | 11/2001 | Croft |
| 7,863,228 B2 | 1/2011 | Loper et al. |
| 9,434,911 B2 | 9/2016 | Bennett et al. |
| 2014/0262319 A1 | 9/2014 | Treybig et al. |
| 2016/0208158 A1 | 7/2016 | Monahan et al. |

FOREIGN PATENT DOCUMENTS

| | | |
|---|---|---|
| CN | 1034218 A | 7/1989 |
| CN | 1264946 C | 7/2006 |
| CN | 103881675 A | 6/2014 |
| CN | 104559957 A | 4/2015 |
| CN | 103254252 B | 10/2015 |
| CN | 109694697 A | 4/2019 |
| CN | 106432378 B | 4/2020 |
| CN | 108101803 B | 3/2021 |
| WO | 2014123709 A1 | 8/2014 |
| WO | 2014200671 A2 | 12/2014 |
| WO | 2015031270 A1 | 3/2015 |

*Primary Examiner* — Aiqun Li

(74) *Attorney, Agent, or Firm* — Osha Bergman Watanabe & Burton LLP

(57) ABSTRACT

A wellbore fluid composition is provided that includes an aqueous base fluid and at least one ethylene ammonium salt having a number average molecular weight in a range of 250 to 500 grams per mole. A method of drilling a wellbore is also provided. the method includes circulating an aqueous drilling fluid into the wellbore while drilling, wherein the aqueous drilling fluid includes at least one ethylene ammonium salt. The aqueous drilling fluid further includes a pH value from 6.5 to 7.5. The method of drilling a wellbore further includes recovering shale cuttings while maintaining wellbore stability.

17 Claims, No Drawings

ETHYLENE AMINE HYDROCHLORIDE BASED SHALE INHIBITOR FOR AQUEOUS DRILLING FLUIDS

BACKGROUND

During drilling operations, a drilling fluid, which may also be referred to as drilling mud, is circulated through the wellbore to cool the drill bit, to maintaining the rheology of the fluids, managing hydrostatic pressure in the wellbore, lubricating the drilling bit, preventing fluid loss into the formation, transporting rock cuttings to the surface, and preventing the swelling of shale formation, among other purposes. Drilling fluids are formulated to have certain fluid characteristics, such as density and rheology, for example, that allow the drilling fluid to perform these functions. Drilling fluids can be categorized into two major categories—oil-based mud (OBM) and water-based mud (WBM). Oil-based drilling fluids have superior inhibition properties, excellent lubricity, and high-temperature stability. However, the high cost and the increasing concerns of environmental toxicity have led to limitation of OBMs in drilling applications. On the other hand, WBMs pose a relatively lower environmental threat in comparison to OBMs while maintaining ideal rheological properties and performance. The use of WBM, however, in the presence of reactive shales often result in detrimental impacts to wellbore integrity.

One additive that may be used is a shale inhibitor. In order to avoid issues of shell swelling, a major issue of WBM, shale inhibitors are often added as an additive in WBMs. Traditional shale inhibitors include various electrolytes such as sodium chloride, potassium chloride, and divalent brine electrolyte for water sensitive shale formations. However, these salts can adversely affect the eco-system by posing threat to the water as well as the soil quality.

In the absence of salts, shale stabilizers thus play important role in combating with the problematic reactive shale formations. Shale swelling leads to instability during well drilling by causing issues such as sloughing, bit balling, caving, high drag and torque, stuck pipe, and disintegration of shale cuttings due to water adsorption to reactive shales. The presence of various clay minerals in shale lead to shale swelling. Clay swelling and wellbore instability results in agglomeration of shale cuttings leading to poor hole cleaning. The increase in solids (or cuttings) can pose difficulties in rheology control. In addition, an increase in the low gravity cuttings can lead to a reduced rate of penetration (ROP). Wellbore instability can lead to financial loss as well as NPT (Non-Productive Time) through the loss of drilling assembly, loss of circulation, and partial or complete loss of the well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid composition including an aqueous base fluid and at least one ethylene ammonium salt having a number average molecular weight in a range of 250 to 500 grams per mole. The ethylene ammonium salt has a chemical structure selected from the group consisting of Formula (I), Formula (II), and combinations thereof.

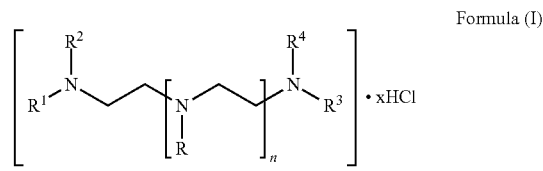

Formula (I)

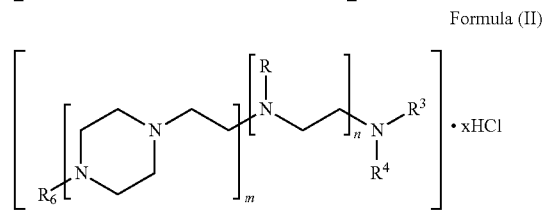

Formula (II)

where R represents a hydrogen, a hydrocarbon group, a substituted hydrocarbon group, an alkyl ester group, or an alkyl amine group having from 1 to 28 carbon atoms, $R_1$, $R_2$, $R_3$, and $R_4$ represent a hydrogen or a hydrocarbon groups having from 1 to 5 carbon atoms, $R_6$ represents a hydrogen atom or an ethylene amine, m is an integer from 1 to 10, n is an integer from 3 to 10, and x is an integer from 1 to 10.

In another aspect, embodiments disclosed herein relate to a method of drilling a wellbore, the method including circulating an aqueous drilling fluid into the wellbore while drilling. The aqueous drilling fluid includes at least one ethylene ammonium salt. The at least one ethylene ammonium salt has a number average molecular weight in a range of 250 to 500 grams per mole, and has a chemical structure selected from the group consisting of Formula (I), Formula (II), and combinations thereof.

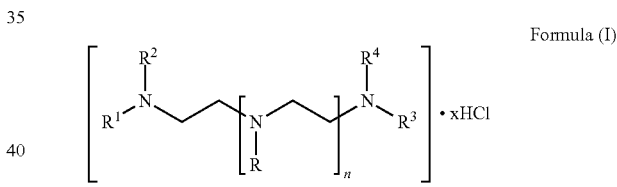

Formula (I)

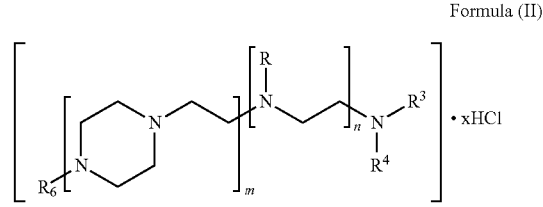

Formula (II)

Where R represents a hydrogen, a hydrocarbon group, a substituted hydrocarbon group, an alkyl ester group, or an alkyl amine group having from 1 to 28 carbon atoms, $R_1$, $R_2$, $R_3$, and $R_4$ represent a hydrogen or a hydrocarbon groups having from 1 to 5 carbon atoms, $R_6$ represents a hydrogen atom or an ethylene amine, m is an integer from 1 to 10, n is an integer from 3 to 10, and x is an integer from 1 to 10, wherein the aqueous drilling fluid includes a pH value of from 6.5 to 7.5. The method further includes recovering shale cuttings while maintaining wellbore stability.

Other aspects and advantages of the claimed subject matter will be apparent from the following description and the appended claims.

DETAILED DESCRIPTION

Embodiments in accordance with the present disclosure generally relate to a composition and method of making an aqueous fluid comprising a shale inhibitor and a method of its use in wellbore fluid. The disclosed composition includes a shale inhibitor that may be cationic or polycationic, meaning the shale inhibitor may have more than one positively charged group on the molecule. In particular, the shale inhibitor includes a hydrocarbon segment, such as at least one ethylene segment, and at least one amine group. A basicity of the amine group may be neutralized with an acid, such that at least one ammonium salt, for example an "amine hydrochloride", is formed on the shale inhibitor. The disclosed shale inhibitors are stable in high salinity brines at elevated temperature.

Shale Inhibitor Composition

One or more embodiments of the present disclosure relate to a composition of matter comprising an ethylene ammonium salt. The ethylene ammonium salt may have a chemical structure as shown in Formula (III) or Formula (IV), below.

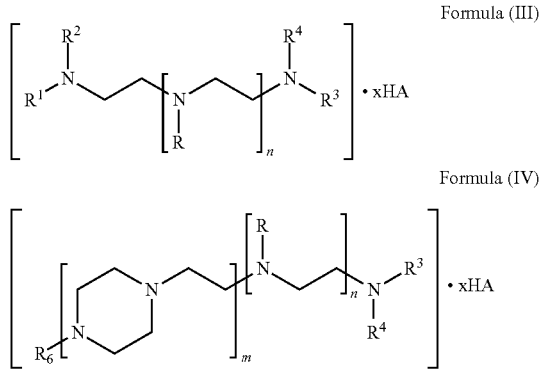

Formula (III)

Formula (IV)

where R may represent a hydrogen, a hydrocarbon group, a substituted hydrocarbon group, an alkyl ester group, or an alkyl amine group having from 1 to 28 carbon atoms. $R_1$, $R_2$, $R_3$, and $R_4$ may be the same or different, and may represent a hydrogen or a hydrocarbon groups having from 1 to 5 carbon atoms. $R_6$ may be the same or different, and $R_6$ may represent hydrogen or an ethylene amine substituent. The notation m may be any integer between 0 and 10. In particular embodiments, m may be 0, 1, 2 or above. The notation n may be any integer between 3 and 10. In particular embodiments, n may be an integer between 3 and 10. The term "HA" refers to an acid. The acid may be a protic acid, such as hydrochloric acid. The acid may be of equivalent amount to the amine groups of the ethylene amine structure of Formulas (III) and (IV), such that x is less than or equal to the amount of amine groups of the ethylene amine structure. The chemical structures shown in Formula (III) and Formula (IV) may be used as a shale inhibitor either separately or in combination as described in further detail below. In one or more particular embodiments, the ethylene ammonium salt may be a mixture of the chemical structures shown in Formula (III) and Formula (IV).

As used throughout this description, the term "hydrocarbon group" refers to branched, straight chain, and/or ring-containing hydrocarbon groups, which may be saturated or unsaturated. The hydrocarbon groups may be primary, secondary, and/or tertiary hydrocarbons. As used throughout this description, the term "substituted hydrocarbon group" refers to a hydrocarbon group (as defined above) where at least one hydrogen atom is replaced with a non-hydrogen group that results in a stable compound. Such substituents may be groups selected from, but are not limited to, halo, hydroxyl, alkoxy, oxo, alkanoyl, aryloxy, alkanoyloxy, amino, alkylamino, arylamino, arylalkylamino, disubstituted amines, alkanylamino, aroylamino, aralkanoylamino, substituted alkanoylamino, substituted arylamino, aubstituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide, substituted sulfonamide, nitro, cyano, carboxy, carbamyl, alkoxycarbonyl, aryl, substituted aryl, guanidine, vinyl, acetylene, acrylate, cyanate, epoxide, and heterocyclyl groups, and mixtures thereof. As used throughout the description, "alkyl amine group" means a hydrocarbon group or a substituted hydrocarbon group as defined above, where at least one carbon atom is replaced with a nitrogen atom. As used throughout the description, "ethylene ammonium" means a hydrocarbon group including two carbons and an ammonium group having ($-NR_3^+$) of the hydrocarbon chain.

In one or more particular embodiments, R may be a hydrogen atom. In one or more embodiments, $R_1$, $R_2$, $R_3$, $R_4$, and $R_6$ may be the same and represent hydrogen atoms.

Method of Making a Shale Inhibitor

Embodiments disclosed herein also relate to a method of making the previously described composition. In one or more embodiments, the method includes agitating a mixture of an ethylene amine precursor having a chemical structure shown in Formula (V) and/or Formula (VI) along with an acid to produce an ethylene ammonium salt having a chemical structure as shown in Formula (III) and/or Formula (IV) above.

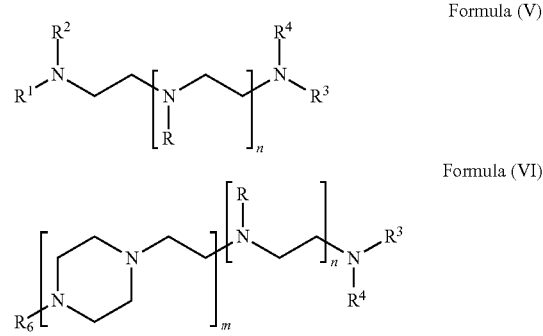

Formula (V)

Formula (VI)

where the notations n and m, R, $R_1$, $R_2$, $R_3$, $R_4$, and $R_6$ are as previously described.

An exemplary, non-limiting reaction mechanism to form an exemplary ethylene ammonium shale inhibitor from an amine and a protic acid, such as hydrochloric acid, is represented by Formula (VII) in accordance with one or more embodiments of the present disclosure.

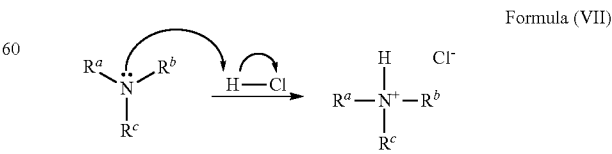

Formula (VII)

where $R^a$, $R^b$, and $R^c$ may be the same or different. In such embodiments, the amine precursor of Formulas (VII)

may be a primary amine, a secondary amine, or a tertiary amine as described in Formulas (V) and (VI) above. In particular embodiments, the reaction shown in Formula (VII) may be performed with a polyamine precursor, such as with the compounds described in Formulas (V) and (VI). In such embodiments, the polyamine precursor has a structure as described by Formulas (V) and (VI) with more than one amine functional groups. The reaction of Formula (VII) with a polyamine precursor may produce a polyammonium compound. The polyamine precursor may partially react such that at least one amine may be converted to at least one ammonium group and some amine functionality remains in the final product. The ammonium group may be a positively charged ammonium, such as ([HNR$_3$]$^+$) neutralized by a local anion, such as chloride ([Cl]$^-$). In such embodiments, R-groups may be as described above. In particular embodiments, the polyamine precursor may completely react such that all amine functional groups are converted to ammonium groups.

In one or more embodiments, a plurality of ethylene amine precursors may be used in the reaction mechanism described above (Formula (VII)). The plurality of ethylene amine precursors may have different chemical structures. Thus, a plurality or mixture of ethylene amine precursors having different chemical structures may be used to produce a mixture of ammonium salts.

In particular embodiments, E-100® (Arabian Amines Co., Jubail Industrial City, Saudi Arabia) may be used as a source of a plurality of ethylene amine precursors to produce a plurality of ethylene ammonium salts. E-100® is a mixture of various linear, cyclic, and branched ethylene amines with an average molecular weight from about 250 to 500 g/mol (grams per mole). In such embodiments, the plurality of ethylene amine precursors may include linear tetraethylenepentamine (TEPA, Formula VIII), pentaethylenehexamine (PEHA, Formula (IX)), hexaethyleneheptamine (HEHA, Formula (X)), higher molecular weight products, and combinations thereof. TEPA, PEHA and HEHA are linear ethylene amines. However, branched and cyclic variations of these structures may also be included in the mixture of amine precursors.

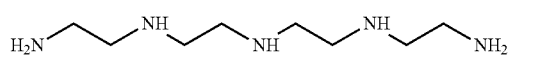

Formula (VIII)

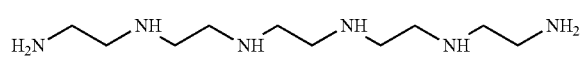

Formula (IX)

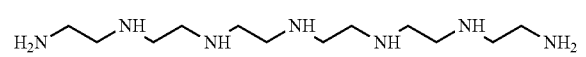

Formula (X)

An exemplary set of amines is shown in Formulas (VIII-XIII). Specifically, Formula (VI) is TEPA, a linear ethylene amine. A branched version, 4-(2-aminoethyl)-N-(2-aminoethyl)-N'-[2-[(2-aminoethyl)amino]ethyl]-1,2-ethanediamine (AETETA) is shown in Formula (IX). Two cyclic versions, 1-(2-aminoethyl)-4-[(2-aminoethyl)amino]-2-piperizine (AEPEEDA) and 1-[2-[[2-[(2-aminoethyl)amino]ethyl]amino]ethyl]-piperazine (PEDETA), are shown in Formulas (X) and (XI), respectively.

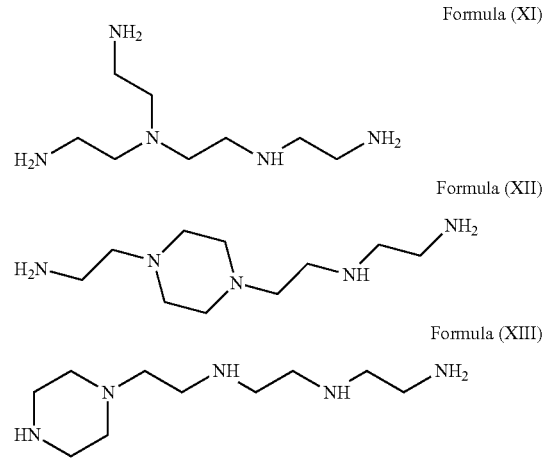

As will be appreciated by those skilled in the art, any ethylene amine structure may be used as a precursor provided it has a suitable molecular weight range.

In one or more embodiments, a plurality of ethylene ammonium salt shale inhibitors produced from a reaction between an acid and the previously described ethylene amines may be a plurality of hydrochloride salts of Formulas VII-XIII In such embodiments, at least one amine of the precursor compounds may be reacted to form an ammonium salt.

In one or more embodiments, an acid may be used to neutralize the basicity of at least one amine on the precursor molecule, thereby forming an ammonium. The acid may be a protic acid. The protic acid may be an inorganic protic acid, such as hydrochloric acid (HCl), hydrobromic acid (HBr), and hydroiodic acid (HI). Alternatively, the protic acid may be an organic protic acid, such as acetic acid (AcOH), citric acid, oxalic acid, malic acid, formic acid, triflic acid, and trifluoroacetic acid. In one or more embodiments, the acid to form the ethylene ammonium salt may be a non-protic electrophile, such as a Lewis acid. Non-limiting examples of Lewis acids include an electrophilic carbon, such as the carbon of iodomethane, or an inorganic metal, such as silver, iron, or zinc.

Non-limiting embodiments of a method of making the disclosed shale inhibitor include synthesizing a hydrochloride salt of an ethylene amine compound using a concentrated acid, such as a concentrated protic acid. The concentrated protic acid may be a 12.1N (Normality) solution of hydrochloric acid.

Embodiments of the present disclosure include synthesizing an ethylene ammonium salt shale inhibitor. Such syntheses include mixing at least one ethylene amine as described above with an acid. The mixture may be agitated to promote basicity neutralization of at least one amine of the ethylene amine by the acid. In such embodiments, the mixture may be maintained at a reduced temperature to produce a shale inhibitor.

The mixture may be maintained at a reduced temperature for a period of time to produce the shale inhibitor. Any suitable reduced temperature may be used, so long as the temperature is sufficient for the components in the mixture to react and prevent degradation of the reaction components. In some embodiments, the reaction temperature may be from about 1 to 20° C. The temperature may have a lower limit of one of about 1, 2, 5, 10, and 15° C. and an upper limit of one of about 10, 15 and 20° C., where any lower limit may be paired with any mathematically compatible upper limit. In particular embodiments, the reduced temperature may be in a range of about 0 to 15° C. or about 5 to about 10° C.

The mixture may be maintained at a reduced temperature for a period of time sufficient to allow the reaction to proceed. In one or more embodiments, the time may have a lower limit of one of about 5, 7, 10, 12 and 15 hours and an upper limit of one of about 17, 20, 22, and 24 hours, where any lower limit may be paired with any mathematically compatible upper limit. During the period in which the mixture is maintained at a reduced temperature, the mixture may be agitated, such as by stirring.

Reaction mixtures in accordance with one or more embodiments of the present disclosure may have a pH before the reaction in a range of about 10 to 12. In particular embodiments, the pH of the mixture before reaction with acid may be in a range of about 11 to 12.

In one or more embodiments, after the ethylene ammonium salt has been produced, the product may be purified by any suitable means, such as by freeze-drying, recrystallization, and/or filtration steps. Such steps are known by those skilled in the art.

Water-Based Wellbore Fluid

The ethylene ammonium salt shale inhibitor of one or more embodiments may be used as a shale inhibitor of wellbore fluids. The wellbore fluids of one or more embodiments of the present disclosure may include, for example, water-based wellbore fluids, such as water-based drilling muds (WBMs), or completion fluids, among others.

The wellbore fluid of one or more embodiments may comprise an ethylene ammonium salt shale inhibitor in an amount ranging from about 0.2 to 10 percent by weight (wt. %) based on the total weight of the wellbore fluid. The ethylene ammonium salt is as described above. For example, the wellbore fluid may contain the ethylene ammonium salt shale inhibitor in an amount ranging from a lower limit of any of 0.2, 0.3, 0.5, 0.7, 0.8, 1.0, 1.5, 2.0, and 2.5 wt. % to an upper limit of any of 0.5, 1.0, 1.5, 2.0, 2.5, 5.0, 7.5, and 10.0 wt. %, where any lower limit can be used in combination with any mathematically-compatible upper limit. In particular embodiments, the wellbore fluid may contain the shale inhibitor in an amount of about 5 to 10 wt. % of the total weight of the wellbore fluid.

Further, other additives may be included in the wellbore fluids of the present disclosure. Such additives may include, for instance, one or more of the groups consisting of weighting agents, viscosifiers, wetting agents, corrosion inhibitors, oxygen scavengers, anti-oxidants, biocides, surfactants, dispersants, interfacial tension reducers, pH buffers, mutual solvents and thinning agents. The wellbore fluids of one or more embodiments may have a pH range from about 6.5 to about 7.5. Weighting agents suitable for use in the wellbore fluids of one or more embodiments include, for example, bentonite, barite, dolomite, calcite, and the like. The identities and use of the aforementioned additives are not particularly limited. One of ordinary skill in the art will, with the benefit of this disclosure, appreciate that the inclusion of a particular additive will depend upon the desired application, and properties, of a given wellbore fluid. For instance, a wellbore fluid of one or more embodiments that is a completion fluid, may comprise a breaker for breaking a filter cake.

The rheological properties of a wellbore fluid are important in determining the suitability of the fluid for a given application.

The wellbore fluid of one or more embodiments may have a density that from 60 lb/ft$^3$ to 160 lb/ft$^3$. For example, the wellbore fluid may have a density that is of an amount ranging from a lower limit of any of 60, 62, 64, 66, 68, 70, 75, and 80 lb/ft$^3$ to an upper limit of any of 66, 68, 70, 75, 80, 90, 100, 110, 125, 145, 150, 155, and 160 lb/ft$^3$, where any lower limit can be used in combination with any mathematically-compatible upper limit.

The apparent viscosity of a fluid is directly related to the swelling rate of the fluid in the presence of an inhibition medium, such as the shale inhibitor of one or more embodiments of the present disclosure. Therefore, a low apparent viscosity demonstrates that the clay does not swell in the presence of the shale inhibitor. The wellbore fluid of one or more embodiments may have an apparent viscosity ranging from about 5 to 250 cP (centipoise). For example, the wellbore fluid may have an apparent viscosity that ranges from a lower limit of any of 5, 10, 15, 20, 25, 30, 45, 60, 75, 100, 125, 150, and 175 cP to an upper limit of any of 100, 110, 125, 150, 175, 200, 225 and 250 cP, where any lower limit can be used in combination with any mathematically-compatible upper limit.

The plastic viscosity of a fluid is a measure of the resistance of the fluid to flow. For instance, drilling fluids that have a lower plastic viscosity have the capacity to drill more quickly. Plastic viscosity is dependent on both the solid content of a fluid and temperature. The wellbore fluid of one or more embodiments may have a plastic viscosity ranging from about 5 to 60 cP. For example, the wellbore fluid may have a plastic viscosity that ranges from a lower limit of any of 5, 10, 15, 20, 25, 30, 40, and 45 cP to an upper limit of any of 25, 30, 35, 40, 45, 50, and 60 cP, where any lower limit can be used in combination with any mathematically-compatible upper limit.

The wellbore fluid of one or more embodiments may have an initial gel strength, such as a gel strength measured after 10 seconds, ranging from about 5 to 20 lb/100 ft$^2$. For example, the wellbore fluid may have an initial gel strength that ranges from a lower limit of any of 5, 6, 7, 8, and 10 lb/100 ft$^2$ to an upper limit of any of 9, 10, 12, 15, and 20 lb/100 ft$^2$, where any lower limit can be used in combination with any mathematically-compatible upper limit.

The wellbore fluid of one or more embodiments may have a final gel strength, such as a gel strength measured after 10 minutes, ranging from about 10 to 35 lb/100 ft$^2$. For example, the wellbore fluid may have a final gel strength that ranges from a lower limit of any of 10, 12, 14, 16, 18, 20, and 25 lb/100 ft$^2$ to an upper limit of any of 15, 18, 20, 25, 30, and 35 lb/100 ft$^2$, where any lower limit can be used in combination with any mathematically-compatible upper limit.

The yield point is the resistance of a fluid to initiate movement and is an assessment of the strength of the attractive forces between the colloidal particles of the fluid. The yield point, for instance, demonstrates the capability of a drilling fluid to raise shale cuttings out of a borehole under dynamic conditions. A fluid with a higher yield point provides better carrying capacity as compared to a fluid with similar density and lower yield point. The wellbore fluid of one or more embodiments may have a yield point ranging from about 5 to 50 lb/100 ft$^2$. In one or more particular embodiments, the yield point may be in a range of 10 to 25 lb/100 ft$^2$. For example, the wellbore fluid may have a plastic viscosity that ranges from a lower limit of any of 0, 2, 5, 7, 10, 15, 20, 25, and 30 lb/100 ft$^2$ to an upper limit of any of 15, 20, 25, 30, 35, 40, 45, and 50 lb/100 ft$^2$, where any lower limit can be used in combination with any mathematically-compatible upper limit.

Reactive shales, when in contact with water-based drilling fluids, tend to swell as they are susceptible to hydration. As one skilled of the art may appreciate, shale inhibitors suppress this hydration, thereby reducing the swelling of the shale. As such, a hydration suppression test may be performed to evaluate the shale inhibition performance of a proposed shale inhibitor. Embodiments of the present disclosure include the ethylene ammonium salts described above as the proposed shale inhibitor.

A test to determine the rolling recovery of shale may be conducted to evaluate the performance of a shale inhibitor in one or more embodiments. Such rolling recovery tests include mixing an amount of shale with an aqueous wellbore fluid including the proposed shale inhibitor, hot rolling the mixture under predetermined conditions, sieving using 4-micron or 5-micron sieves, washing the shale collected that did not pass through the sieve. Processed shale cuttings are then dried and weighed. A higher rolling recovery is indicative of low shale erosion from the aqueous wellbore fluid. The wellbore fluid of one or more embodiments may have a rolling recovery of shale cuttings of greater than 60%, greater than 70%, greater than 80%, greater than 85%, or greater than 90%.

Fluid loss evaluation of an aqueous-based wellbore fluid of one or more embodiments of the present disclosure relates to a measurement of the static filtration behavior of a WBM at ambient temperature and at a specified pressure, such as 100 psi (pounds per square inch). In particular embodiments, fluid loss tests may be performed according to parameters established by the American Petroleum Institutes (API).

The wellbore fluid of one or more embodiments may have a fluid loss of less than 8 mL. For example, the wellbore fluid may have a fluid loss that ranges from a lower limit of any of 0, 1, 2, 3, 4, 5, and 6 mL to an upper limit of any of 6, 7, 8, 9, and 10 mL, where any lower limit can be used in combination with any mathematically-compatible upper limit.

Wellbore fluids of one or more embodiments may be circulated into a wellbore or subterranean formation using techniques known to a person of ordinary skill in the art. The wellbore fluids of one or more embodiments may be used as one or more of a drilling or drill-in fluid during the drilling of a wellbore, as a completion fluid for the completion of a wellbore after drilling is completed, and a workover fluid that is used for well workover.

Embodiments of the present disclosure may provide at least one of the following advantages. A positively charged ammonium ion of the ethylene amine salt shale inhibitor may interact with a clay surface of a shale formation. In such embodiments, the interaction of the positively charged ammonium ion may include an exchange of a cation on the clay surface with the positively charge ammonium ion. In one or more embodiments, the exchange of the positively charged ammonium ion of the shale inhibitor with the cation on the clay surface may achieve improved adsorption on the clay through hydrogen bonding. As one skilled in the art may appreciate, amines in an uncharged (or a "free base" or a "free amine") state may adsorb onto clays via hydrogen bonding and Van der Waals attractions. In addition, other basic groups including but not limited to amides and hydroxy groups may interact with a surface of the clay in a similar manner as the free amine. In such instances, free amines and other basic groups will not cause cation exchange with cations of the clay surface.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Thus, particular implementations of the subject matter have been described. Other implementations are within the scope of the following claims.

EXAMPLES

Materials and Methods

E-100® was obtained from Arabian Amines Co. (Jubail Industrial City, Saudi Arabia). E-100 is a mixture of tetraethylenepentamine (TEPA), pentaethylenehexamine (PEHA), hexaethyleneheptamine (HEHA), and others. Concentrated hydrochloric acid (HCl, 12.1 N) and sodium chloride (NaCl) were obtained from Fischer Scientific. KLA-Stop was obtained from Schlumberger (Houston, TX, USA). Qusaiba shale was obtained locally from Saudi Arabia. API bentonite was obtained from India. FloTol was obtained from M-I Swaco. PAC™ LV was obtained from Halliburton. Sodium hydroxide (NaOH) was obtained from Sigma Aldrich. Flowzan® was obtained from Chevron Phillips Chemical. PAL FLC starch was obtained from Oren Hydrocarbon. Calcium carbonates $CaCO_3$ 25 and $CaCO_3$ 50 were purchased from Halliburton. Barite was obtained from India.

Synthesis of Ethylene Ammonium Salt 133 mL (milliliters) of E-100® was added to a beaker and cooled in an ice water bath having a temperature between 5-10° C. The temperature was maintained throughout the reaction. Concentrated HCl (130 mL) was added to the cooled E-100® in increments of 0.5 mL under constant stirring using a glass rod. HCl was added until the pH of the solution was 7.5. At the end of the addition of HCl, a 68-70% w/w aqueous solution of ethylene amine hydrochloride salt (E-100® salt) was obtained. The ethylene amine hydrochloride salt was used in fluid formulation as described below without further purification or isolation.

Fluid Composition

Aqueous-based fluids were formulated using varying amounts of E-100® salt in water as described in Table 1. The E-100® salt shale inhibitor was added to a mass of water and mixed for 5 minutes (min). After mixing the amount of salt shale inhibitor with water, API Bentonite was added to the fluid formulations and mixed for 20 minutes to form aqueous dispersions. Further studies were performed using fluids formulated as presented below.

TABLE 1

Aqueous-based fluid composition for ethylene ammonium salt
(E-100 ® salt) shale inhibition studies.

| Additive | Mix time (min) | Fluid 1 | Fluid 2 | Fluid 3 | Fluid 4 |
|---|---|---|---|---|---|
| Water, g | | 350 | 350 | 350 | 350 |
| E-100 ® salt, g | 5 | 0 | 1 | 5 | 10 |
| API Bentonite, g | 20 | 30 | 30 | 30 | 30 |

Fluid Characterization

Rheological features such as apparent viscosity, plastic viscosity, initial gel strength, final gel strength. and yield point (YP) was determined for the fluids formulated as presented in Table 1. The fluids hot-rolled at 150° F. for 16 h under 500 psi pressure after mixing. The values presented below were obtained from a model 35A viscometer (FANN instrument company, Houston, USA) at various dial readings.

To measure the initial and final gel strength of fluids of Table 1, a viscometer was operated at 600 rpm (rotations per minute) for 10 s and then switched off for 10 s and 10 min, respectively. Afterward, the viscometer was operated at a revolution speed of 3 rpm.

TABLE 2

Rheological properties of various water-based
fluid formulations with ethylene amine hydrochloride
(E-100 ® salt) shale inhibitor.

| | Rheological Properties at 120° F. (cP) | | | |
|---|---|---|---|---|
| Dial Readings (rpm) | Fluid 1 | Fluid 2 | Fluid 3 | Fluid 4 |
| 600 | 121 | 42 | 19 | 6 |
| 300 | 86 | 28 | 15 | 3 |
| 200 | 72 | 21 | 13 | 2 |
| 100 | 52 | 14 | 11 | 2 |
| 6 | 12 | 5 | 7 | 0 |
| 3 | 9 | 4 | 7 | 0 |
| PV, cp | 35 | 14 | 4 | 3 |
| YP, lb/100 ft$^2$ | 51 | 14 | 11 | 0 |
| 10 sec Gel strength, lb/100 ft$^2$ | 9 | 8 | 7 | 1 |
| 10 min Gel strength, lb/100 ft$^2$ | 28 | 17 | 9 | 2 |

In the absence of E-100® salt, the bentonite dispersion showed a YP value of 51 at 120° F. (Fluid 1, Table 2). However, addition of E-100® salt in the dispersions, suppresses the hydration of bentonite in water thereby resulting in lower YP values (Fluids 2, 3 and 4) as indicated by the observed decreasing gel strength with an increase of the E-100® salt concentration. These hydration suppression tests therefore show that E-100® salt can be an effective shale inhibitor when used in water-based drilling fluids.

Rolling Recovery Tests

Water-based muds as described in Table 3 were formulated for shale erosion tests. Fluid 5 was formulated with 10.5 ppb of E-100® salt, and Fluid 6 was formulated with 10.5 ppb of commercially available Kla-Stop shale inhibitor.

TABLE 3

Formulation of water-based mud used in shale erosion study.

| Additives | Fluid 5 | Fluid 6 |
|---|---|---|
| Water, ppb | 327 | 327 |
| NaCl (7%), ppb | 26 | 26 |
| Flowzan ®, ppb | 1 | 1 |
| Flo-Trol, ppb | 4 | 4 |
| PAC ™ LV, ppb | 1 | 1 |
| NaOH, ppb | 0.1 | 0.1 |
| E-100 ® salt, ppb | 10.5 | — |
| KLA-STOP, ppb | — | 10.5 |

As described in embodiments above, the recovery percentage of shale may be determined by adding shale cuttings to the formulated fluids 5 and 6 as described in Table 3 above. Shale cuttings were prepared using Qusaiba shale. Water-based mud (350 mL) was then added to a hot rolling cell, and 20 grams of 4 mesh-5 mesh Qusaiba shale cuttings was added to the hot rolling cell. This mixture was hot rolled at 150° F. for 16 hours at 500 psi (pounds per square inch). These shale cutting-fluid compositions were hot rolled at 25 rpm and 150° F. for 16 h in a rolling oven. In this regard, the cuttings were expected to pass through 4 micron mesh sieve and retain on 5 micron mesh sieves.

After cooling, the shale cuttings were separated from the fluid by sieving and washed with water. The sieved shale cuttings were then gently washed with 5 wt % KCl brine to remove the excess mud. Washed shale cutting samples were then dried in an oven over night at 80° C. Dried samples were then weighed, and percent shale recovery was calculated based on Equation 1, below. Results for shale recovery of various fluids are shown in Table 4.

$$\text{Shale recovery (\%)} = \text{recovered shale cuttings (g)}/20 \text{ g} \times 100 \quad \text{Eqn. 1}$$

TABLE 4

Shale Recovery Results.

| Fluids | Shale recovery (%, ±2-3%) |
|---|---|
| Base mud without any shale inhibitor | 16.5 |
| Water based mud with E-100 ® salt (Fluid 5) | 63.2 |
| Water based mud with KLA-STOP (Fluid 6) | 59.3 |

The above results demonstrate that the water-based mud with E-100® salt yielded improved shale recovery when compared to mud formulated with commercial KLA-STOP shale inhibitor. However, Fluid 5 was formulated with 10 ppb E-100® salt shale inhibitor solution with 70 wt % ethylene ammonium salt. In effect, these studies demonstrate that a lower concentration of E-100® salt shale inhibitor is required to achieve comparable shale inhibition. As a result, a direct comparative study was further performed to evaluate the ethylene ammonium salt shale inhibitor performance of a WBM.

In a comparative study, the effective concentration of E-100® salt in the aqueous solution was reduced to 70 wt % as compared to fluids containing 100 wt % KLA-Stop and 100 wt % E-100. Based on recovery performance as calculated and shown in Table 5, it was determined that water-based fluid with 10 ppb solution of 70 wt % E-100® salt maintains a higher shale recovery than both commercial shale inhibitors KLA-Stop and E-100 at 7 ppb concentrations.

TABLE 5

Shale erosion test results with alternate formulations.

| Fluids | Shale recovery (%, ±2-3%) |
| --- | --- |
| Water based mud with E-100 ®, 7 ppb | 55.2 |
| Water based mud with E-100 ® salt, 10 ppb | 64.8 |
| Water based mud with KLA-STOP, 7 ppb | 47.2 |

American Petroleum Institute (API) Fluid Loss Test

Further experiments were performed to formulate 90 pcf (pounds per cubic foot) water-based drilling fluid with E-100® salt. As described in Table 6, Fluid 7 was formulated with 5 ppb E-100® salt. Additives, their respective concentrations, and the order of mixing is given in Table 6. After mixing the additives, the fluid was hot rolled at 150° F. for 16 hours at 500 psi. After hot rolling, the rheology of the fluid was measured at 120° F. at various dial readings as presented in Table 7.

TABLE 6

Formulation of 90 pcf water-based mud with E-100 ® salt shale inhibitor.

| Formulation | Mixing Time (min) | Fluid 7 Components (ppb) |
| --- | --- | --- |
| Water | | 273.2 |
| Flowzan ® | 5 | 1 |
| PAL FLC | 5 | 4 |
| NaCl | | 58 |
| NaOH | 5 | 0.5 |
| Barite | 5 | 142.6 |
| CaCO$_3$ 50 | 5 | 10 |
| CaCO$_3$ 25 | 5 | 10 |
| E-100 ® salt | 5 | 5 |

TABLE 7

Rheological properties of various water-based fluid formulations with ethylene amine hydrochloride (E-100 ® salt) shale inhibitor.

| Dial Readings (rpm) | Rheological Properties at 120° F. (cP) Fluid 7 |
| --- | --- |
| 600 | 43 |
| 300 | 33 |
| 200 | 27 |
| 100 | 19 |
| 6 | 5 |
| 3 | 3 |
| PV, cp | 10 |
| YP, lb/100 ft$^2$ | 23 |
| 10 sec Gel strength, lb/100 ft$^2$ | 6 |
| 10 min Gel strength, lb/100 ft$^2$ | 7 |
| pH | 9.1 |
| API LTLP fluid loss, 30 min, ml | 3.5 |

Fluid 7 was determined to have a plastic viscosity and a yield point of 10 cp and 23 lb/100 ft$^2$, respectively and an API fluid loss of 3.5 mL. The formulated water-based fluid 7 was determined to have good rheological and filtration properties, thereby showing that E-100® salt did not have any detrimental effect on the hot rolled fluid.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A wellbore fluid, comprising:
   a mixture of ethylene ammonium salts having a number average molecular weight in a range of 250 to 500 grams per mole, wherein the mixture of ethylene ammonium salts comprises different chemical structures selected from the group consisting of Formula (I), Formula (II), and combinations thereof;

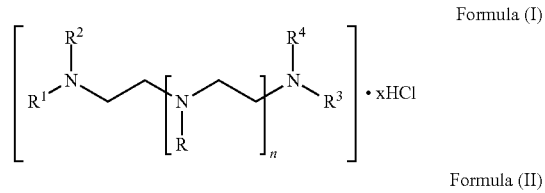

Formula (I)

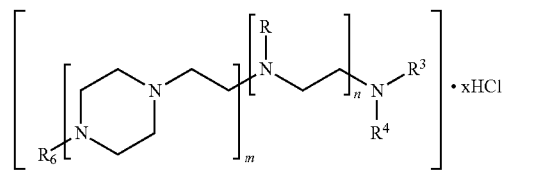

Formula (II)

wherein:
   each R of Formula (I) and Formula (II) is independently selected from hydrogen or a hydrocarbon group, a substituted hydrocarbon group, an alkyl ester group, or an alkyl amine group having from 1 to 28 carbon atoms;
   each $R_1$ and $R_2$ of Formula (I) and each $R_3$ and $R_4$ of Formula (I) and Formula (II) is independently selected from hydrogen or a hydrocarbon groups having from 1 to 5 carbon atoms;
   each $R_6$ is independently selected from a hydrogen atom or an ethylene amine;
   each m is independently selected from an integer from 1 to 10;
   each n of Formula (I) and Formula (II) is independently selected from an integer from 3 to 10; and
   each x of Formula (I) and Formula (II) is independently selected from an integer from 1 to 10; and
   an aqueous base fluid,
   wherein a pH of the wellbore fluid is in a range from 6.5 to 7.5.

2. The wellbore fluid of claim 1, wherein the mixture of ethylene ammonium salts is a shale inhibitor.

3. The wellbore fluid of claim 1, wherein the mixture of ethylene ammonium salts comprises a compound selected from the group consisting of a linear ethylene ammonium salt, a cyclic ethylene ammonium salt, a branched ethylene ammonium salt, and combinations thereof.

4. The wellbore fluid of claim 1, wherein the mixture of ethylene ammonium salts is a reaction product of an ethylenic amine substituent and a protic acid.

5. The wellbore fluid of claim 4, wherein the protic acid is hydrochloric acid.

6. The wellbore fluid of claim 1, further comprising one or more additives selected from the group consisting of weighting agents, viscosifiers, wetting agents, corrosion inhibitors, oxygen scavengers, anti-oxidants, biocides, surfactants, dispersants, interfacial tension reducers, pH buffers, mutual solvents, and thinning agents.

7. The wellbore fluid of claim 1, wherein the wellbore fluid has an apparent viscosity in a range from about 5 to 250 cP.

8. The wellbore fluid of claim 1, wherein the wellbore fluid has a plastic viscosity in a range from about 5 to 60 cP.

9. The wellbore fluid of claim 1, wherein the wellbore fluid has a yield point in a range from about 5 to 50 lb/100 ft² (pounds per 100 square feet).

10. The wellbore fluid of claim 1, wherein the aqueous based fluid is an aqueous drilling mud.

11. A method of drilling a wellbore, the method comprising:
circulating an aqueous drilling fluid into the wellbore while drilling,
wherein the aqueous drilling fluid comprises a mixture of ethylene ammonium salts,
wherein the mixture of ethylene ammonium salts has a number average molecular weight in a range of 250 to 500 grams per mole, and
wherein the mixture of ethylene ammonium salts comprises different chemical structures selected from the group consisting of Formula (I), Formula (II), and combinations thereof;

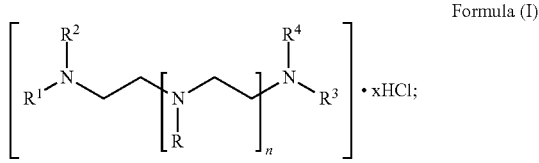

Formula (I)

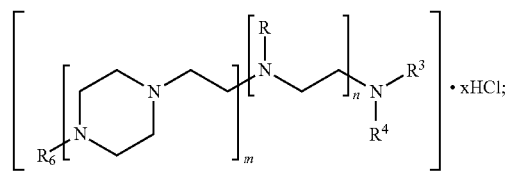

Formula (II)

wherein each R of Formula (I) and Formula (II) is independently selected from hydrogen or a hydrocarbon group, a substituted hydrocarbon group, an alkyl ester group, or an alkyl amine group having from 1 to 28 carbon atoms;

each $R_1$ and $R_2$ of Formula (I) and each $R_3$ and $R_4$ of Formula (I) and Formula (II) is independently selected from hydrogen or a hydrocarbon groups having from 1 to 5 carbon atoms;

each $R_6$ is independently selected from a hydrogen atom or an ethylene amine;

each m is independently selected from an integer from 1 to 10;

each n of Formula (I) and Formula (II) is independently selected from an integer from 3 to 10; and each x of Formula (I) and Formula (II) is independently selected from an integer from 1 to 10; and wherein the aqueous drilling fluid comprises a pH value of from 6.5 to 7.5; and recovering shale cuttings while maintaining wellbore stability.

12. The method of claim 11, wherein the mixture of ethylene ammonium salts is a shale inhibitor.

13. The method of claim 11, wherein the mixture of ethylene ammonium salts is a reaction product of an ethylenic amine substituent and a protic acid, wherein the protic acid is hydrochloric acid.

14. The method of claim 11, wherein the aqueous drilling fluid has an apparent viscosity in a range from about 5 to 250 cP.

15. The method of claim 11, wherein the aqueous drilling fluid has a plastic viscosity in a range from about 5 to 60 cP.

16. The method of claim 11, wherein the aqueous drilling fluid has a yield point in a range from about 5 to 50 lb/100 ft².

17. The method of claim 11, wherein the aqueous drilling fluid has a rolling recovery of shale cuttings of greater than 60%.

* * * * *